Patented May 21, 1929.

1,714,173

UNITED STATES PATENT OFFICE.

JOHN M. KESSLER, OF WEST ORANGE, AND OREGON B. HELFRICH, OF ORANGE, NEW JERSEY, ASSIGNORS TO THE KESSLER CHEMICAL COMPANY, OF ORANGE, NEW JERSEY, A CORPORATION OF NEW JERSEY.

ETHER-ALCOHOL ESTERS OF POLYCARBOXYLIC ACIDS.

No Drawing. Application filed April 25, 1928. Serial No. 272,855.

The invention relates to esters of polycarboxylic acids and to compositions in which such esters are present as an ingredient, and includes correlated improvements and discoveries whereby and wherewith the knowledge of these esters, their properties and uses are enhanced.

An object of the invention is to provide new esters of polycarboxylic acids possessing characteristics and properties which make them economically important in the manufacture of various compositions.

A further object of the invention is to provide new compounds obtained by the interaction of an aliphatic ether-alcohol, alone and in admixture with another aliphatic ether-alcohol and a polyhydric aliphatic alcohol, and a polycarboxylic acid, particularly those having the carboxyl groups in such relative position as to yield an anhydride under suitable conditions.

A more particular object of the invention is to provide new esters of phthalic acid obtained by reaction between phthalic anhydride and an aliphatic ether-alcohol, alone and in admixture, which phthalates lend themselves to economical manufacture and to incorporation as an ingredient in coating compositions, plastics and films.

Another object of the invention is to provide a composition of matter in which an aliphatic ether-alcohol ester of a polycarboxylic acid is an ingredient along with pyroxylin or nitrocellulose, and in case the composition is in the nature of a lacquer, it will also include solvents and diluents.

Other objects of the invention will in part be obvious and will in part appear hereinafter.

The invention accordingly comprises the new compounds and compositions of matter possessing the characteristics and properties which will be exemplified in the compound and composition of matter hereinafter described, and the scope of the application of these will be indicated in the claims.

For a further understanding of the nature and objects of the invention, reference should be had to the following detailed description:

The use of lacquers, other coating compositions, plastics, etc. in the manufacture of which the new compounds herein described are utilizable has become very extensive within the past few years, and the suggestions made and studies undertaken to improve the quality and properties of such compositions have been many. At the present time the manufacture of pyroxylin lacquers, more particularly, constitutes a considerable part of the paint and varnish industry, and these lacquers have, in a large measure, displaced varnishes and oil enamels. Lacquers usually consist of pyroxylin dissolved in a mixture of volatile solvents and diluents, to which admixture there may be added a gum for the purpose inter alia of improving the adhesion and appearance of the lacquer and a high boiling compound, i. e., a "plasticizing agent" for decreasing the brittleness of the film.

The new compounds which are included within the scope of this invention may be aligned rather with the "plasticizing agents" and gums.

In practice the invention may be carried out by bringing an aliphatic ether-alcohol as diethylene glycol (otherwise designated as $\beta$, $\beta'$ dihydroxy ethyl ether), triethylene glycol, diethylene glycol ethyl ether (otherwise designated as $\beta$ hydroxy $\beta'$ ethoxy ethyl ether), diethylene glycol butyl ether (otherwise designated as $\beta$ hydroxy $\beta'$ butoxy ethyl ether), dipropylene glycol, ethylene propylene diglycol, etc., or an ether derivative thereof by substituting a hydrocarbon radical for an H of an OH group, as ethyl, propyl, butyl, amyl, etc. into interaction with a polycarboxylic acid as succinic acid, glutaric acid, maleic acid, phthalic acid, the naphthalene polycarboxylic acids under conditions such that water is split out and an ester of the carboxylic acid formed. The esterification may be effected by heating the aliphatic ether-alcohol and the polycarboxylic acid, preferably in the form of its anhydride, in a suitable vessel until the desired reaction is completed. If desired, the aliphatic ether-alcohol may be present in excess, whereupon, at the completion of the reaction, this excess is removed by distillation. Further, the mixture may be heated, either alone or in the presence of a suitable catalyst, for example an acid, as sulphuric acid and hydrochloric acid.

The reactions taking place may be illustratively represented by the following equations.

Simple esters

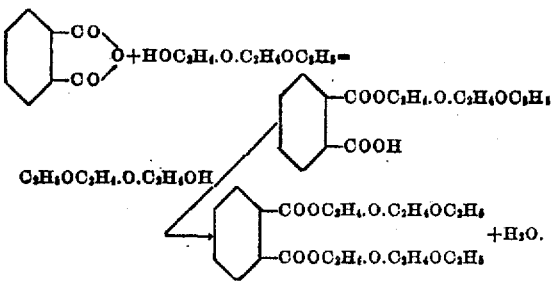

Mixed esters:

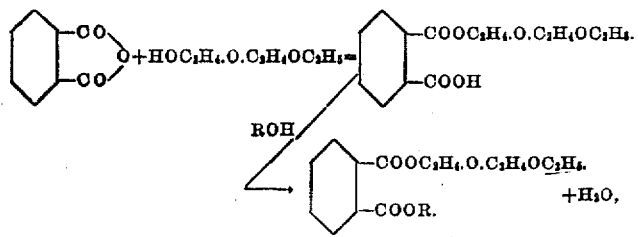

wherein R represents —$C_2H_4.O.C_2H_4OC_4H_9$, or other diethylene glycol alkyl ether residue—excepting ethyl, —$CH_2.CH_2OH$ ethylene glycol residue, —$CH.CHOH.CH_2OH$ glycerol residue, and an alkyl according to the ester desired. It is understood of course that there is no limitation to reactions in which one of the reacting compounds is the ethyl ether of diethylene glycol.

Furthermore, if a mixed ester is desired, the esterification may be partially completed with one aliphatic ether-alcohol, and then carried through to full esterification by another aliphatic ether-alcohol, i. e., in the event for example, that a dicarboxylic acid, as phthalic acid, were used, there would be obtained a compound in which the hydrogen of one carboxyl would be replaced by the ester group of a certain aliphatic ether-alcohol, and the hydrogen of the other carboxyl would be replaced by the ester group of a different aliphatic ether-alcohol.

Also, compositions may be prepared in which partial esterification is brought about by an aliphatic alcohol, as methyl alcohol, propyl alcohol, isoamyl alcohol, etc., and in which an aliphatic polyhydric alcohol, as ethylene glycol and glycerol, replace in part the esterification, due to the aliphatic ether-alcohol and these compositions are characterized by a greater degree of hardness than when the composition comprises esters of the aliphatic ether-alcohols alone.

As illustrative embodiments of a manner in which the invention may be practiced, the following examples may be given:

*Example I.*

Esterification of phthalic anhydride with diethylene glycol:

148 gms. of phthalic anhydride and 110 gms. of diethylene glycol are placed in a suitable vessel provided with a reflux condenser and heated for a period of about six hours at a temperature of from 480–490 degrees F. After this period of heating the temperature is raised to 550 degrees F., and a stream of carbon dioxide may be passed through for about one hour. The ester thus formed may be characterized as a soft gum. It has a clear brownish-red color, is soluble in ethyl acetate and has an acid number of seven.

If it is desired to have a product of a lighter color and of a greater range of solubility, but with a higher acid number, then such product may be made in accordance with the foregoing example, but under conditions of less prolonged heat treatment.

*Example II.*

Esterification of phthalic anhydride with diethylene glycol and ethylene glycol:

The procedure is that as outlined under Example I, there being taken in this case 148 gms. of phthalic anhydride 80 gms. of diethylene glycol and 20 gms. of ethylene glycol. The product obtained has an acid number of seventeen, if of amber color, is hard to the touch, is not sticky, and softens at about 50 degrees C.

*Example III.*

Esterification of phthalic anhydride with diethylene glycol ethyl ether:

148 gms. of phthalic anhydride and 390 gms. of diethylene glycol ethyl ether and 1 cc. of concentrated sulphuric acid are placed in a suitable vessel provided with a reflux condenser and heated for a period of about three hours. The mixture is then distilled from a suitable distilling flask until the temperature reaches 200 degrees C. At this point the phthalic anhydride is more than 95 per cent esterified, and the product is then neutralized with an aqueous solution of sodium carbonate having a concentration of about five per cent, subsequent to which it is washed several times with hot water. The water may be driven off by heating the product to about 160 degrees C. for a half hour with a current of air passing through it. This reaction, while hastened by the presence of sulphuric acid as a catalyst, may be carried out without the sulphuric acid and the velocity increased by using an excess of the diethylene glycol ethyl ether which is later recovered by distillation.

*Example IV.*

Esterification of phthalic anhydride with diethylene glycol ethyl ether and ethylene glycol:

The procedure may be carried out as under Example III, using 148 gms. of phthalic anhydride, 390 gms. of technical diethylene glycol ethyl ether containing about 5 per cent of ethylene glycol and 1 cc. of concentrated sulphuric acid.

The composition obtained is an amber-colored viscous liquid, having a viscosity about that of glycerol. The specific gravity is about 1.1765 at 20 degrees C. It has a flash-point of 265–270 degrees C. and an acidity of .11 per cent, as phthalic acid.

The ester formed by the interaction of phthalic anhydride and diethylene glycol is, at 20 degrees C., a very viscous, transparent material possessing valuable properties as a plasticizer-resin in the manufacture of lacquer compositions. It can be made practically water white and with a viscosity, as of soft pitch. If a greater degree of hardness is desired, this may be obtained by employing diethylene glycol containing a polyhydric aliphatic alcohol, as ethylene glycol and glycerol.

The esters obtained by esterification, using derivatives of diethylene glycol as the monoalkyl ethers are oils of varying viscosities having a specific gravity greater than water and a solvent action on nitrocellulose of the type used in lacquer manufacture. These products possess low volatility, and accordingly are well adapted as plasticizers in lacquers. They also remain in the lacquer film indefinitely, and hence impart to it a longer life. It may be considered that the flash-point is a measure of volatility, and on this basis the superiority of the diethylene glycol ethyl ether ester of phthalic acid which has a flash-point of 265–270 degrees C., for incorporation into lacquer composition, will be apparent when compared with the flash-point of dibutyl phthalate the most widely used plasticizer at the present time, which is 165–170 degrees C.

The mixed phthalate esters are particularly valuable in that the solubility of the mixed ester may be considerably greater than that of the simple ester. For example, the mixed ester of phthalic acid with diethylene glycol and diethylene glycol ethyl ether is much more soluble than the simple phthalic acid ester with diethylene glycol. Such mixed phthalic esters combine plasticizer and resin properties and are soluble in lacquer solvent mixtures, for example, toluol 60 per cent, butyl acetate 30 per cent and butyl alcohol 10 per cent.

It will be understood, of course, that the invention includes the mixed esters of polycarboxylic acids with aliphatic ether-alcohols, the simple esters and the esters obtained when a part of the aliphatic ether-alcohol is replaced by an aliphatic alcohol.

Since certain changes may be made with respect to the above compounds and compositions of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. As new compounds, the aliphatic ether-alcohol esters of polycarboxylic acids.
2. As new compounds, the substituted aliphatic ether-alcohol esters of polycarboxylic acids.
3. As a new compound, a diethylene glycol ester of a polycarboxylic acid.
4. As new compounds, the diethylene glycol ethyl ether esters of polycarboxylic acids.
5. As new compounds, the aliphatic ether-alcohol esters of phthalic acids.
6. As a new compound, a diethylene glycol ester of phthalic acid.
7. As a new compound, a diethylene glycol ethyl ether ester of phthalic acid.
8. A composition of matter, including an aliphatic ether-alcohol ester of a polycarboxylic acid.
9. A composition of matter, including a diethylene glycol ester of a polycarboxylic acid.
10. A composition of matter, including a diethylene glycol ester of phthalic acid.
11. A composition of matter, including a diethylene glycol ethyl ether ester of phthalic acid.
12. As a new compound the diethylene glycol ethyl ether ester of phthalic acid which is a neutral viscous liquid having a specific gravity of 1.1765 at 20 degrees C. and a flashpoint of 265–270 degrees C.

13. As new compounds, the mixed esters of aliphatic ether-alcohols and polycarboxylic acids.

14. As new compounds, the mixed esters of aliphatic ether-alcohols and phthalic acid.

15. As new compounds, the mixed esters of an aliphatic ether-alcohol, an aliphatic alcohol and a polycarboxylic acid.

16. As new compounds, the mixed esters of an aliphatic ether-alcohol, an aliphatic alcohol, and phthalic acid.

17. A composition of matter, comprising esters of a polycarboxylic acid with an aliphatic ether-alcohol, and a polyhydric aliphatic alcohol.

18. A composition of matter, comprising esters of phthalic acid with an aliphatic ether-alcohol, and a polyhydric aliphatic alcohol.

19. A composition of matter, comprising esters of a polycarboxylic acid with a diethylene glycol and a polyhydric aliphatic alcohol.

20. A composition of matter, comprising esters of phthalic acid with a diethylene glycol, and a polyhydric aliphatic alcohol.

21. A composition of matter, comprising esters of phthalic acid with diethylene glycol ethyl ether, and ethylene glycol.

In testimony whereof we affix our signatures.

JOHN M. KESSLER.
OREGON B. HELFRICH.

CERTIFICATE OF CORRECTION.

Patent No. 1,714,173.  Granted May 21, 1929, to

JOHN M. KESSLER ET AL.

It is hereby certified that error appears in the printed specification of the above numbered patent requiring correction as follows: Page 2, line 74, for the word "if" read "is"; and that the said Letters Patent should be read with this correction therein that the same may conform to the record of the case in the Patent Office.

Signed and sealed this 25th day of June, A. D. 1929.

(Seal)

M. J. Moore,
Acting Commissioner of Patents.

is a neutral viscous liquid having a specific gravity of 1.1765 at 20 degrees C. and a flash-point of 265–270 degrees C.

13. As new compounds, the mixed esters of aliphatic ether-alcohols and polycarboxylic acids.

14. As new compounds, the mixed esters of aliphatic ether-alcohols and phthalic acid.

15. As new compounds, the mixed esters of an aliphatic ether-alcohol, an aliphatic alcohol and a polycarboxylic acid.

16. As new compounds, the mixed esters of an aliphatic ether-alcohol, an aliphatic alcohol, and phthalic acid.

17. A composition of matter, comprising esters of a polycarboxylic acid with an aliphatic ether-alcohol, and a polyhydric aliphatic alcohol.

18. A composition of matter, comprising esters of phthalic acid with an aliphatic ether-alcohol, and a polyhydric aliphatic alcohol.

19. A composition of matter, comprising esters of a polycarboxylic acid with a diethylene glycol and a polyhydric aliphatic alcohol.

20. A composition of matter, comprising esters of phthalic acid with a diethylene glycol, and a polyhydric aliphatic alcohol.

21. A composition of matter, comprising esters of phthalic acid with diethylene glycol ethyl ether, and ethylene glycol.

In testimony whereof we affix our signatures.

JOHN M. KESSLER.
OREGON B. HELFRICH.

CERTIFICATE OF CORRECTION.

Patent No. 1,714,173.  Granted May 21, 1929, to

JOHN M. KESSLER ET AL.

It is hereby certified that error appears in the printed specification of the above numbered patent requiring correction as follows: Page 2, line 74, for the word "if" read "is"; and that the said Letters Patent should be read with this correction therein that the same may conform to the record of the case in the Patent Office.

Signed and sealed this 25th day of June, A. D. 1929.

(Seal)

M. J. Moore,
Acting Commissioner of Patents.